2,852,495

RESINOUS POLYMERS OF DI-ESTER MONOMERS

Jerry H. Hunsucker, Carmel, Ind., assignor to J. I. Holcomb Manufacturing Company, Inc., Indianapolis, Ind., a corporation No Drawing. Application September 26, 1955
Serial No. 536,766

1 Claim. (Cl. 260—78.4)

This invention relates to synthetic resins, and more particularly to certain resins produced by esterification of dicarboxylic acids with cyclic alcohols and allylic alcohols, and polymerization of the resulting monomers.

The novel resin of my invention is produced by polymerization of a monomer prepared by the reaction of the anhydride or half-acyl halide of a dicarboxylic acid selected from the group consisting of maleic acid, itaconic acid, dichloromaleic acid, tetrahydrophthalic acid, cis-4-cyclohexene-1, 2-dicarboxylic acid, succinic acid, 1,2-cyclopentyl dicarboxylic acid and glutaric acid; and a monocarbocyclic monohydric-alcohol having from 5 to 6 carbon atoms in the nucleus thereof, to form a half ester between the acid and the alcohol; followed by an esterification of the remaining carboxyl group by an alcohol having the formula $$CH_2=CH-(CH_2)_n-OH$$

wherein $n$ is a small whole number ranging from 1 to 3. In this way there is formed a monomeric diester which can be represented by the formula

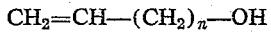

wherein $R_1O$-represents the residue of a monocarbocyclic alcohol having from 5 to 6 carbon atoms in the nucleus thereof, $R_2$ represents the atoms which when taken together with the carbonyl groups form the residue of a dicarboxylic acid selected from the group consisting of maleic acid, itaconic acid, dichloromaleic acid, tetrahydrophthalic acid, cis-4-cyclohexene-1, 2-dicarboxylic acid, succinic acid, 1,2-cyclopentyl dicarboxylic acid and glutaric acid, and $OR_3$-represents an allylic alcohol having from 3 to 5 carbon atoms.

The monomers thus prepared and having the stated formula are clear, colorless to amber liquids of relatively high boiling point. Upon heating the monomers, using a catalyst such as an organic peroxide, if desired, a polymer is formed, the state of polymerization of which is determined by the temperature and time of heating. Polymerization can also be effected by exposing thin films of the monomer to the action of light and air. Generally, the degree of polymerization is most conveniently followed by the change in index of refraction of the polymer while it is liquid, or the rise in the melting point at the higher degrees of polymerization. When completely polymerized, the resin formed is hard and clear, and may be light and transparent or dark colored and opaque depending upon the purity of the starting materials and the presence of any added filler or coloring matter. The completely polymerized resin is thermoplastic and of high melting point, and is suitable for molding purposes. It is soluble in benzene, morpholine and the like aromatic hydrocarbon solvents, and is insoluble in water, alcohols, turpentine and aliphatic hydrocarbon solvents.

The polymers of the compounds of my invention are especially useful for incorporation into waxes and polishes, particularly in the form of liquid partial polymers of relatively low molecular weight. In this form, they can be kept for long periods substantially without change, but when applied in wax polish compositions as thin films which are exposed to light and air they continue to polymerize, forming a polish film of exceptionally high gloss and durability.

The cyclic alcohols which are useful for the preparation of the new monomers are exemplified by cyclohexanol, cyclopentanol, methyl cyclopentanol, and the like. The allylic alcohols which are employed to complete the esterification of the intermediate half-ester are alcohols similar to, and equivalent to, allyl alcohol. Thus, for example, methallyl alcohol, 2-pentenol, 1-methyl buten 2-ol and the like can be used.

The following examples will more specifically illustrate the preparation and properties of the new monomers and polymers of my invention.

EXAMPLE 1

Preparation of cyclohexylallylmaleate

A mixture of 200 g. of cyclohexanol, 196 g. of maleic anhydride and 200 ml. of benzene is heated until the maleic anhydride melts. Stirring is then begun and the temperature of the mixture is raised to the refluxing point. Stirring and refluxing are continued for about two hours. To the resulting solution are added 156 g. of allyl alcohol, 200 ml. of benzene and 1 ml. of conc. sulfuric acid. The reaction mixture is then refluxed, using a water trap, and heating is continued until about 42 ml. of water have been removed. The reaction mixture is then cooled and washed with three successive 100 ml. portions of water, followed by 100 ml. of 5% aqueous sodium carbonate, and 100 ml. of water. The washed solution is dried over anhydrous magnesium sulfate, and the benzene and excess of cyclohexanol are removed therefrom by distillation under reduced pressure. The residual oil, comprising the cyclohexylallylmaleate formed in the reaction, is purified by distillation under reduced pressure and is found to boil at 133–137° C. at the pressure of 1 mm. of mercury.

A mixture of 50 g. of cyclohexylallylmaleate and 0.05 g. of di-tertiary butyl peroxide is slowly and uniformly heated to about 130° C. and maintained at that temperature, the total time of heating being about two hours. A clear viscous liquid, consisting of polymerized cyclohexylallylmaleate, is formed, and is found to have index of refraction $n_D{}^{25}=1.490$.

When the period of heating is prolonged to 3 or more hours, a clear light-colored solid thermoplastic resin is obtained, the color being dependent upon the purity of the original monomer.

By using methallyl alcohol in the foregoing procedure instead of allyl alcohol, there is produced cyclohexylmethallylmaleate, which on heating with di-tertiary butyl peroxide forms a liquid partial polymer, or a solid substantially transparent thermoplastic resin, as the period of heating is increased.

EXAMPLE 2

Preparation of cyclopentylallylmaleate

A mixture of 25 g. of cyclopentanol, 29 g. of maleic anhydride and 100 ml. of benzene are heated to refluxing for about 2 hours, and then 34.5 g. of allyl alcohol, 50 ml. of benzene and 5 drops of conc. sulfuric acid are added thereto. The solution is refluxed, with a water trap, until about 5.4 ml. of water have been collected. The solution is then cooled and washed with several successive portions of water, then with dilute sodium carbonate solution, and again with water. The washed solution is dried with anhydrous magnesium sulfate, the excess of cyclopentanol and benzene are removed by distillation under reduced pressure, and the residual oil, consisting of cyclopentylallylmaleate, is purified by distillation under reduced pressure.

Cyclopentylallylmaleate thus prepared boils at about 131–136° C. at the pressure of 3 mm. of mercury.

A mixture of 50 g. of cyclopentylallylmaleate and 0.05 g. of di-tertiary butyl peroxide is slowly and uniformly heated to about 130° C. and maintained at that temperature until the refractive index of a sample is $n_D^{25}=1.492$. The somewhat viscous liquid partial polymer of cyclopentylallylmaleate thus produced is suitable for use in an aqueous emulsion-type wax polish composition.

EXAMPLE 3

Preparation of cyclohexylallyldichloromaleate

A mixture of 50 g. of cyclohexanol, 88 g. of dichloromaleic anhydride and 150 ml. of benzene is heated to refluxing for about two hours. The temperature is then reduced to about 60° C. and 39 g. of allyl alcohol and 0.5 ml. of conc. sulfuric acid are added to the mixture. The reaction mixture is refluxed under a water trap until about 21 ml. of water have been removed. The cyclohexylallyldichloromaleate formed in the reaction is recovered by the procedure of Example 1.

Cyclohexylallyldichloromaleate thus prepared is a high-boiling liquid.

A mixture of 50 g. of cyclohexylallyldichloromaleate and 0.075 g. of di-tertiary butyl peroxide is heated to about 130° C. for about two hours. A somewhat viscous liquid partial polymer is produced, which has $n_D^{25}=$ about 1.49. Further heating for a period of about two hours produces a hard, semi-transparent solid thermoplastic resin consisting of polymerized cyclohexylallylmaleate.

EXAMPLE 4

Preparation of cyclohexylallylsuccinate

The procedure of Example 1 is repeated, except that 50 g. of cyclohexanol, 50 g. of succinic anhydride and 50 g. of benzene are used in the first step of the process, and 58 g. of allyl alcohol and 0.5 ml. of conc. sulfuric acid are used in the second step of the process, and refluxing is continued until 10 ml. of water have been removed.

Cyclohexylallylsuccinate thus prepared is a clear high-boiling liquid.

EXAMPLE 5

Preparation of cyclohexylallyltetrahydrophthalate

A mixture of 76 g. of tetrahydrophthalic anhydride, 50 g. of cyclohexanol and 75 ml. of benzene is refluxed for about 2½ hours. The temperature of the resulting solution is dropped to about 60–65° C., and 58 g. of allyl alcohol, 75 ml. of benzene and .05 ml. of conc. sulfuric acid are added thereto. The mixture is refluxed under a water trap and heating is continued until 25 ml. of water have been removed. The cyclohexylallyltetrahydrophthalate formed in the reaction is purified by the procedure described in Example 1.

Cyclohexylallyltetrahydrophthalate thus prepared is a high-boiling liquid.

A mixture of 100 g. of cyclohexylallyltetrahydrophthalate and 0.1 g. of di-tertiary butyl peroxide is heated in an oil bath at about 130° C. for about two hours, or until a sample of the viscous partial polymer which is formed has index of refraction $n_D^{25}=1.492$. The liquid polycyclohexylallyltetrahydrophthalate thus produced is suitable for incorporation into liquid wax polishing compositions as a fortifying agent.

EXAMPLE 6

Preparation of cyclohexylallyl-cis-4-cyclohexene-1, 2-dicarboxylate

A mixture of 15.2 g. of cis-4-cyclohexene-1, 2-dicarboxylic anhydride, 10 g. of cyclohexanol and 100 ml. of benzene is refluxed for about two hours. The temperature of the resulting solution is then dropped to about 60° C. and 10 g. of allyl alcohol, 50 ml. of benzene and 3 drops of conc. sulfuric acid are added thereto. The mixture is heated to refluxing under a water trap until about 2.5 ml. of water have been removed. The cyclohexylallyl - cis - 4 - cyclohexene - 1, 2 - dicarboxylate formed in the reaction is recovered according to the procedure of Example 1.

The cyclohexylallyl ester of cis-4-cyclohexene-1, 2-dicarboxylic acid thus prepared is a clear, high-boiling liquid.

EXAMPLE 7

Preparation of cyclohexylallylitaconate

A mixture of 29 g. of itaconic anhydride, 30 g. of cyclohexanol and 50 ml. of benzene is heated to refluxing for about two hours. The resulting solution is cooled and 34.8 g. of allyl alcohol and 0.5 ml. of conc. sulfuric acid are added thereto. The mixture is refluxed under a water trap until about 5.4 ml. of water are removed. The cyclohexylallylitaconate which is formed in the reaction is recovered according to the procedure of Example 1.

Cyclohexylallylitaconate thus prepared is a clear, high-boiling liquid.

A mixture of 50 g. of cyclohexylitaconate and 0.05 g. of di-tertiary butyl peroxide is heated slowly to about 130° C. Heating is continued until a sample of the partial polymer has index of refraction $n_D^{25}=1.49$. The somewhat viscous liquid partial polymer of cyclohexylallylitaconate thus prepared can be incorporated into wax polish compositions as a fortifying agent.

EXAMPLE 8

Preparation of cyclohexylallylglutarate

The procedure of Example 1 is repeated, except that 50 g. of cyclohexanol, 50 g. of glutaric anhydride and 50 g. of benzene are used in the first step of the process, and 58 g. of allyl alcohol and 0.5 ml. of concentrated sulfuric acid are used in the second step of the process, and refluxing is continued until 10 ml. of water have been removed.

Cyclohexylallylglutarate thus prepared is a high-boiling liquid, which can be polymerized by the method set forth in Example 1.

The invention claimed is:

A resinous homo-polymer selected from the group consisting of a homo-polymer of cyclohexylallylmaleate, a homo-polymer of cyclopentylallylmaleate, a homo-polymer of cyclohexyldichloromaleate, a homo-polymer of cyclohexylallyltetrahydrophthalate and a homo-polymer of cyclohexylallylitaconate.

References Cited in the file of this patent

UNITED STATES PATENTS

| | | |
|---|---|---|
| 2,005,414 | Dykstra | June 18, 1935 |
| 2,375,516 | Blair | May 8, 1945 |
| 2,433,616 | Marple et al. | Dec. 30, 1947 |
| 2,445,189 | Shokal | July 13, 1948 |
| 2,445,627 | Morris et al. | July 20, 1948 |
| 2,502,645 | Elwell | Apr. 4, 1950 |
| 2,603,560 | Stewart | July 15, 1952 |